(12) United States Patent
Dachiku

(10) Patent No.: US 9,210,443 B2
(45) Date of Patent: Dec. 8, 2015

(54) VIDEO SERVER AND DATA RECORDING AND PLAYBACK METHOD

(75) Inventor: Kenshi Dachiku, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 217 days.

(21) Appl. No.: 13/359,411

(22) Filed: Jan. 26, 2012

(65) Prior Publication Data

US 2012/0307911 A1    Dec. 6, 2012

(30) Foreign Application Priority Data

May 30, 2011 (JP) ................. 2011-120931

(51) Int. Cl.
*H04N 7/26* (2006.01)
*H04N 19/70* (2014.01)

(52) U.S. Cl.
CPC .................. *H04N 19/70* (2014.11)

(58) Field of Classification Search
CPC .................... H04N 19/70
See application file for complete search history.

(56) References Cited

U.S. PATENT DOCUMENTS

| | | | | |
|---|---|---|---|---|
| 6,529,550 B2 * | 3/2003 | Tahara et al. | ................ | 375/240 |
| 7,602,526 B2 | 10/2009 | Kandono et al. | | |
| 7,688,471 B2 | 3/2010 | Kadono et al. | | |
| 7,809,060 B2 | 10/2010 | Toma et al. | | |
| 7,843,994 B2 | 11/2010 | Toma et al. | | |
| 2006/0056705 A1 | 3/2006 | Kadono et al. | | |
| 2006/0153463 A1 | 7/2006 | Notoya et al. | | |
| 2006/0171600 A1 * | 8/2006 | Kikuchi | ................. | 382/232 |
| 2007/0104455 A1 * | 5/2007 | Kikuchi | ................. | 386/68 |
| 2007/0110390 A1 * | 5/2007 | Toma | ................. | 386/68 |
| 2008/0117988 A1 * | 5/2008 | Toma et al. | ............. | 375/240.26 |
| 2008/0118218 A1 | 5/2008 | Toma et al. | | |
| 2008/0118224 A1 | 5/2008 | Toma et al. | | |
| 2008/0131079 A1 | 6/2008 | Toma et al. | | |
| 2008/0216116 A1 * | 9/2008 | Pekonen et al. | ................ | 725/39 |
| 2008/0219393 A1 | 9/2008 | Toma et al. | | |
| 2009/0010323 A1 * | 1/2009 | Su et al. | .................. | 375/240.01 |
| 2009/0316781 A1 | 12/2009 | Kadono et al. | | |
| 2009/0323815 A1 | 12/2009 | Kadono et al. | | |
| 2010/0020883 A1 * | 1/2010 | Miyauchi et al. | ........ | 375/240.25 |

(Continued)

FOREIGN PATENT DOCUMENTS

JP    2004-248255         9/2004
JP    2007-325289 A2    12/2007

OTHER PUBLICATIONS

Office Action received in Japanese Patent Application No. 2011-120931, mailed on Apr. 9, 2013; 4 pages.

*Primary Examiner* — Dave Czekaj
*Assistant Examiner* — Mohammad J Rahman
(74) *Attorney, Agent, or Firm* — Knobbe, Martens, Olson & Bear LLP

(57) ABSTRACT

According to one embodiment, a video server includes an analyzer and a storage. The analyzer detects a sequence parameter set (SPS) and a picture parameter set (PPS) in a stream of a data file includes picture slices, SPSs and PPSs. The analyzer stores the detected SPS and PPS. When the analyzer detects a first picture slice in a random access unit (RAU) in the stream, the analyzer generates an additional header including all SPSs and PPSs in the stream of the data file, which are stored before detection of the first picture slice. The analyzer inserts the additional header immediately before the RAU. The storage stores the data file in which the additional header is inserted.

6 Claims, 4 Drawing Sheets

(56) References Cited

U.S. PATENT DOCUMENTS

2010/0329632 A1* 12/2010 Mizutani ............... 386/233
2011/0200095 A1 8/2011 Kadono et al.
2013/0064284 A1* 3/2013 Samuelsson et al. .... 375/240.01

* cited by examiner

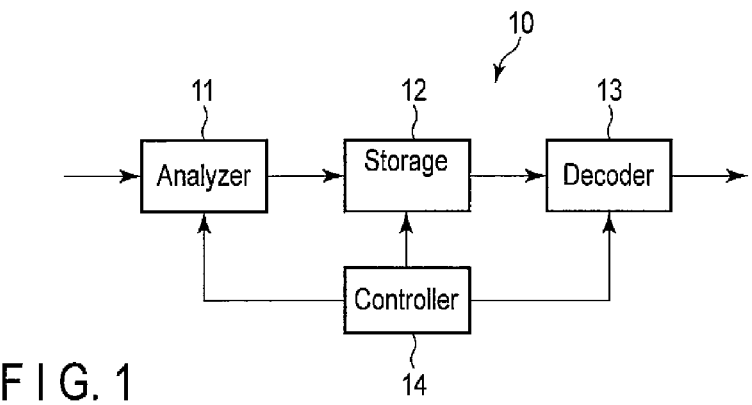
F I G. 1
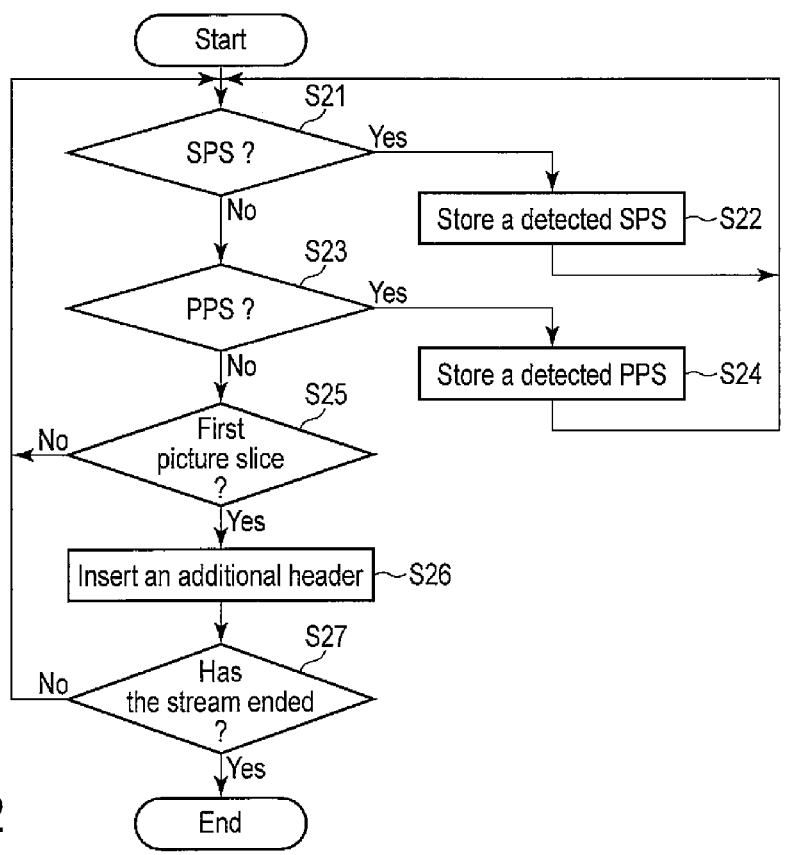
F I G. 2

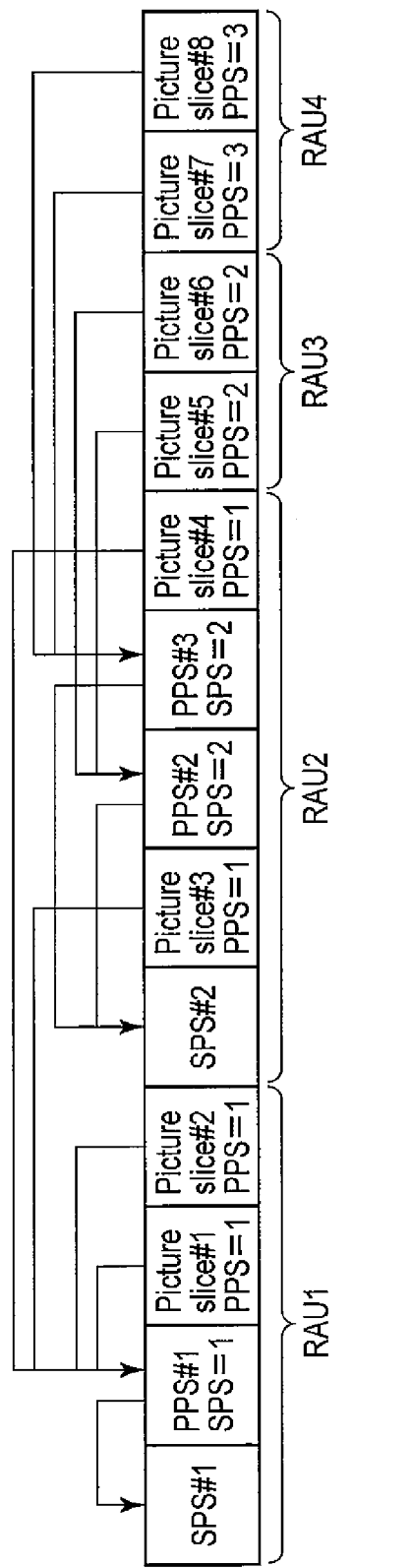
F I G. 3

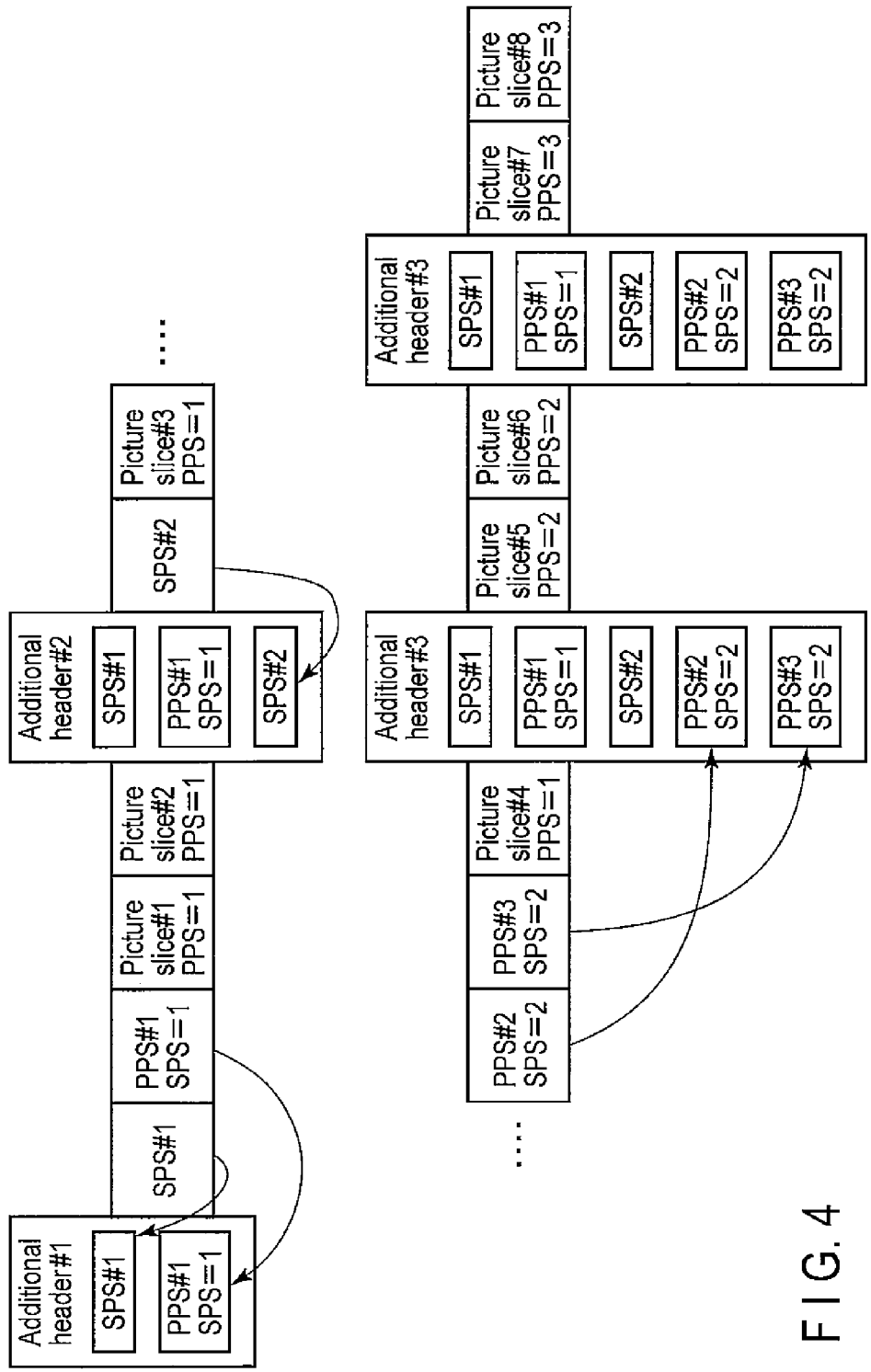
F I G. 4

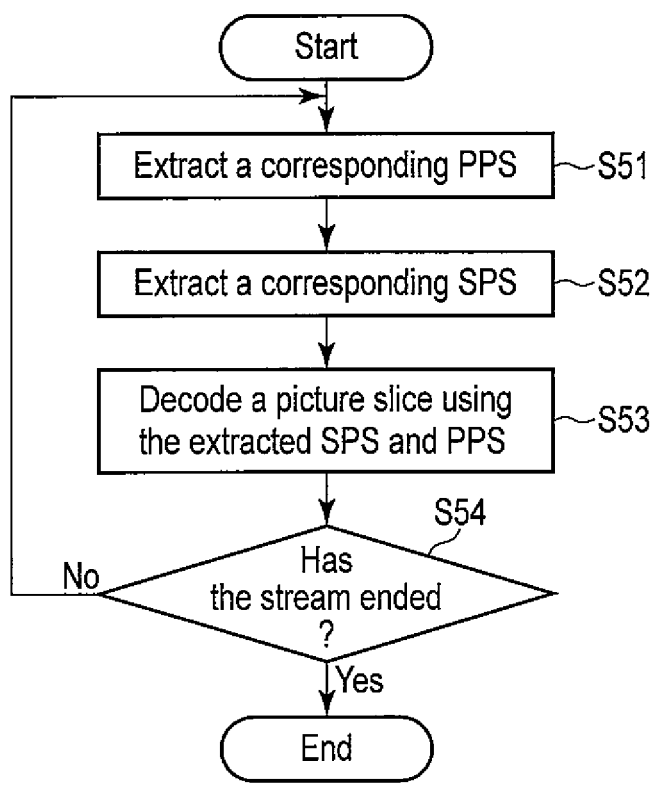
F I G. 5

VIDEO SERVER AND DATA RECORDING AND PLAYBACK METHOD

CROSS-REFERENCE TO RELATED APPLICATIONS

This application is based upon and claims the benefit of priority from prior Japanese Patent Application No. 2011-120931, filed May 30, 2011, the entire contents of which are incorporated herein by reference.

FIELD

Embodiments described herein relate generally to a video server and a data recording and playback method.

BACKGROUND

A data file encoded based on H.264 includes a plurality of picture slices forming a picture included in a sequence, a sequence parameter set (SPS) including information on encoding of the entire sequence, and a picture parameter set (PPS) including information on encoding of the entire picture. The sequence corresponds to the entire compressed moving image. The picture is one screen forming the sequence. A unit of a predetermined number of picture slices, based on which a picture can be decoded independently of another picture slice is called a random access unit (RAU). The RAU may include the SPS and/or PPS. The concept of an RAU in H.264 is similar to that of group of pictures (GOP) in MPEG-2.

When these types of data files are played back, a plurality of picture slices included in the RAU need to be decoded based on the SPS and PPS. If the encoding method is MPEG-2, a sequence can be played back from the middle without complicated processing by decoding the GOP because all information necessary for decoding is included in a GOP header.

However, if the encoding method is H.264, the SPS and PPS are not always the first and second data units in an RAU to be read. For example, if an RAU to be read is not the first RAU in a sequence, the SPS and PPS necessary for decoding the RAU may not be in the RAU to be read, but may be the first and second data units in the first RAU in the sequence. To play back such a sequence from the middle, it is necessary to first send to a decoder the SPS and PPS, which are the first and second data units in the first RAU in the sequence, and then send to the decoder the picture slices included in the RAU to be read. Further, the SPS and PPS may be in an RAU in the middle of a sequence, which is not the RAU to be read. In such a case, the SPS and PPS for decoding the picture slices included in the RAU to be read need to be searched for in the sequence. As a result of that, complicated processing is required.

BRIEF DESCRIPTION OF THE DRAWINGS

FIG. 1 is a block diagram showing a functional configuration of a video server according to an embodiment.

FIG. 2 is a flowchart showing how the analyzer shown in FIG. 1 inserts an additional header.

FIG. 3 shows a stream configuration of a data file supplied to the video server shown in FIG. 1.

FIG. 4 shows a stream configuration of a data file obtained by inserting the additional header to the data file shown in FIG. 3.

FIG. 5 is a flowchart showing how the decoder of the video server shown in FIG. 1 decodes the data file.

DETAILED DESCRIPTION

In general, according to one embodiment, a video server includes an analyzer and a storage. The analyzer detects a sequence parameter set and a picture parameter set in a stream of a data file includes picture slices forming a picture included in a sequence, sequence parameter sets necessary for decoding the sequence, and picture parameter sets necessary for decoding the picture. The analyzer stores the detected sequence parameter set and picture parameter set. When the analyzer detects a first picture slice in a random access unit in the stream, the analyzer generates an additional header including all sequence parameter sets and picture parameter sets in the stream of the data file, which are stored before detection of the first picture slice. The random access unit includes the picture slices. The analyzer inserts the additional header immediately before the random access unit. The storage stores the data file in which the additional header is inserted.

First Embodiment

FIG. 1 is a block diagram showing a functional configuration of a video server 10 according to the present embodiment. The video server 10 shown in FIG. 1 includes an analyzer 11, a storage 12, an encoder 13 and a controller 14.

The analyzer 11 receives a data file converted based on H.264. The data file includes a plurality of picture slices forming a picture included in a sequence, a sequence parameter set (SPS), and a picture parameter set (PPS). The sequence corresponds to the entire encoded moving image.

One or more units of a predetermined number of picture slices form one picture included in the sequence. A unit including an SPS, a PPS, and the predetermined number of picture slices is called a random access unit (RAU). The RAU does not always include the SPS and PPS. The picture slice is provided with a header, and the header includes a number of a PPS referred to at the time of decoding.

The SPS includes information on encoding of the entire sequence, such as a profile, a level, and an encoding mode of the entire sequence. The SPS is not always the first data unit in the first RAU of the sequence.

The PPS includes information on encoding of the entire picture, such as an entropy encoding mode and a quantization parameter initialization value for each picture. The PPS also includes a number of an SPS referred to at the time of decoding. The PPS is not attached to all the pictures. However, an SPS referred by a PPS must be provided before the PPS.

In accordance with an instruction from the controller 14, the analyzer 11 analyzes the received data file and detects an RAU. If the detected RAU includes an SPS and/or PPS before the first picture slice in the RAU, the analyzer 11 generates an additional header including the SPS and PPS and all the SPSs and PPSs included in the RAUs detected in the data file before the RAU. The additional header is a header newly added to enable easy random access at the time of playback. The analyzer 11 inserts the generated additional header between the detected RAU and the RAU detected last, i.e., immediately before the detected RAU. The analyzer 11 performs this processing for all the RAUs included in the data file. The analyzer 11 outputs the data file in which the additional header has been inserted to the storage 12.

In accordance with an instruction from the controller 14, the storage 12 stores the data file output from the analyzer 11.

The storage 12 also reads a stored data file in accordance with an instruction from the controller 14. When the storage 12 reads the picture slices included in an RAU, the storage 12 reads all the SPSs and PPSs written in the additional header positioned immediately before the RAU, and then reads the picture slices included in the RAU. The storage 12 outputs the read SPSs, PPSs and picture slices to the decoder 13.

In accordance with an instruction from the controller 14, the decoder 13 decodes each picture slice included in the RAU using a PPS designated by the number included in the picture slice and an SPS designated by the number included in the PPS among the SPSs and PPSs written in the additional header immediately before the RAU. The decoder 13 outputs a video signal obtained by decoding to the subsequent stage.

The controller 14 controls the operation of the video server 10.

Next, the operation of the video server 10 configured as described above will be described. First, the case where the video server 10 records a data file having an H.264-encoded stream configuration will be described. FIG. 2 is a flowchart showing how the analyzer 11 in the video server 10 of the present embodiment inserts the additional header in the data file when the data file is recorded. Hereinafter, the case where the analyzer 11 receives the data file having the configuration shown in FIG. 3 will be described. FIG. 4 shows a stream configuration of a data file in which the additional header has been inserted by the analyzer 11.

The data file shown in FIG. 3 includes picture slices #1-#8, SPSs #1-#2, and PPSs #1-#3. SPS #1, PPS #1 and picture slices #1, #2 are included in RAU 1. SPS #2, PPSs #2, #3 and picture slices #3, #4 are included in RAU 2. Picture slices #5, #6 are included in RAU 3. Picture slices #7, #8 are included in RAU 4. PPS=1 is assigned to picture slices #1-#4, and picture slices #1-#4 are associated with PPS #1 as indicated by arrows. PPS=2 is assigned to picture slices #5, #6, and picture slices #5, #6 are associated with PPS #2 as indicated by arrows. PPS=3 is assigned to picture slices #7, #8, and picture slices #7, #8 are associated with PPS #3 as indicated by arrows. SPS=1 is assigned to PPS #1, and PPS #1 is associated with SPS #1 as indicated by an arrow. SPS=2 is assigned to PPS #2 and PPS #3, and PPS #2 and PPS #3 are associated with SPS #2 as indicated by arrows. Accordingly, RAUs 1, 2 form sequence S1, and RAUs 3, 4 form sequence S2.

In the processing shown in FIG. 2, the analyzer 11 analyses a stream, and detects an RAU (steps S21-S25). Upon receipt of the stream shown in FIG. 3, the analyzer 11 detects SPS #1, which is the first data unit in RAU 1 (step S21). The analyzer 11 stores SPS #1 detected in step S21 in an inner memory (step S22), and proceeds to step S21.

The second data unit in RAU 1 is PPS #1. After performing step S21, the analyzer 11 detects PPS #1 in step S23 (step S23). The analyzer 11 stores PPS #1 detected in step S23 in the inner memory (step S24), and proceeds to step S21.

The third data unit in RAU 1 is picture slice #1, which is the first picture slice in RAU 1. After performing steps S21, S23, the analyzer 11 detects picture slice #1 in step S25 (step S25). When the analyzer 11 detects the first picture slice #1 in RAU 1 (Yes in step S25), the analyzer 11 generates additional header #1 including SPS #1 and PPS #1. The analyzer 11 inserts additional header #1 before SPS #1, which is the first data unit in RAU 1 (step S26). The arrow directed to additional header #1 in FIG. 4 indicates that SPS #1, which is the first data unit in RAU 1, and PPS #1, which is the second data unit in RAU 1, are written in additional header #1.

Subsequently, the analyzer 11 determines whether the data stream has ended (step S27). If the data stream continues (No in step S27), the analyzer 11 proceeds to step S21. If the data stream has ended (Yes in step S27), the analyzer 11 finishes processing. The analyzer 11 repeats steps S21-s27 until the data stream ends.

The fourth data unit in RAU 1 is picture slice #2. After performing steps S21, S23, the analyzer 11 detects picture slice #2 in step S25. Since picture slice #2 is not the first picture slice in RAU 1 (No in step S25), the analyzer 11 proceeds to step S21.

After picture slice #2, RAU 2 is detected. The first data unit in RAU 2 is SPS #2. The analyzer 11 detects SPS #2 (Yes in step S21), and stores the detected SPS #2 in the inner memory (step S22).

The second data unit in RAU 2 is picture slice #3, which is the first picture slice in RAU 2. After performing steps S21, S23, the analyzer 11 detects picture slice #3 in step S25 (step S25). Since picture slice #3 is the first picture slice in RAU 2 (Yes in step S25), the analyzer 11 inserts additional header #2 including SPS #1, PPS #1 and SPS #2 before SPS #2, which is the first data unit in RAU 2 (step S26). The arrow directed to additional header #2 in FIG. 4 indicates that SPS #2, which is the first data unit in RAU 2, is newly written in additional header #2.

The third data unit in RAU 2 is PPS #2. After performing step S21, the analyzer 11 detects PPS #2 in step S 23 (Yes in step S23), and stores the detected PPS #2 in the inner memory (step S24).

The fourth data unit in RAU 2 is PPS #3. After performing step S21, the analyzer 11 detects PPS #3 in step S23 (Yes in step S23), and stores the detected PPS #3 in the inner memory (step S24).

The fifth data unit in RAU 2 is picture slice #4. After performing steps S21, S23, the analyzer 11 detects picture slice #4 in step S25. Since picture slice #4 is not the first picture slice in RAU 2 (No in step S25), the analyzer 11 proceeds to step S21.

After picture slice #4, RAU 3 is detected. The first data unit in RAU 3 is picture slice #5, which is the first picture slice in RAU 3. After performing steps S21, S23, the analyzer 11 detects picture slice #5 in step S25. Since picture slice #5 is the first picture slice in RAU 3 (Yes in step S25), the analyzer 11 inserts additional header #3 including SPS #1, PPS #1, SPS #2, PPS #2 and PPS #3 before picture slice #5, which is the first data unit in RAU 3 (step S26). The arrow directed to additional header #3 in FIG. 4 indicates that PPS #2, which is the third data unit in RAU 2, and PPS #3, which is the fourth data unit in RAU 2, are written in additional header #3.

The second data unit in RAU 3 is picture slice #6. After performing steps S21, S23, the analyzer 11 detects picture slice #6 in step S25. Since picture slice #6 is not the first picture slice in RAU 3 (No in step S25), the analyzer 11 proceeds to step S21.

After picture slice #6, RAU 4 is detected. The first data unit in RAU 4 is picture slice #7, which is the first picture slice in RAU 4. After performing steps S21, S23, the analyzer 11 detects picture slice #7 in step S25. Since picture slice #7 is the first picture slice in RAU 4 (Yes in step S25), the analyzer 11 inserts additional header #3 including SPS #1, PPS #1, SPS #2, PPS #2 and PPS #3 before picture slice #7, which is the first data unit in RAU 4 (step S26).

The analyzer 11 stops processing shown in FIG. 2 in accordance with a stop instruction from the controller 14.

Next, a case where the video server 10 plays back a recorded data file will be described. FIG. 5 is a flowchart showing how the decoder 13 of the video server 10 of the present embodiment decodes the data file when the data file is played back.

In accordance with a playback instruction from the controller 14, the storage 12 reads a stored data file. Hereinafter, a case where the data file shown in FIG. 4 is stored in the storage 12, and a playback instruction to play back the data file from RAU 2 is given from the controller 14 will be described.

When the storage 12 receives from the controller 14 the playback instruction to play back the data file from RAU 2, the storage 12 reads the stored data file from a corresponding position. For example, the storage 12 reads SPS #1, PPS #1 and SPS #2 in additional header #2 situated before SPS #2, which is the first data unit in RAU 2. Then, the storage 12 reads picture slices #3, #4 included in RAU 2. The storage 12 outputs the read SPS #1, PPS #1, SPS #2 and picture slices #3, #4 to the decoder 13.

The decoder 13 takes out PPS #1 designated by PPS=1 assigned to picture slices #3, #4 from the SPS #1, PPS #1 and SPS #2 output from the storage 12 (step S51). The decoder 13 takes out SPS #1 designated by SPS=1 assigned to PPS #1 from the SPS #1, PPS #1 and SPS #2 output from the storage 12 (step S52).

The decoder 13 decodes picture slices #3, #4 using the SPS #1 and PPS #1 taken out (step S53). The decoder 13 outputs a video signal obtained by decoding to the subsequent stage.

Subsequently, the decoder 13 determines whether the stream has ended (step S54). If the stream continues (No in step S54), the decoder 13 proceeds to step S51, and processes RAU 3. If the stream has ended (Yes in step S54), the decoder 13 finishes processing.

The decoder 13 also stops the processing shown in FIG. 5 in accordance with a stop instruction from the controller 14.

In the above-described embodiment, the analyzer 11 inserts, before the first data unit in the RAU, an additional header including all the SPSs and PPSs detected in the data file before the first picture slice included in the detected RAU. The analyzer 11 does not write the selected SPS and PPS in the additional header but select only an SPS and PPS necessary for decoding the RAU. Therefore, the processing load on the analyzer 11 is small. Further, the analyzer 11 stores in the storage 12 a stream in which the additional header has been inserted before the first data unit of each RAU. Therefore, the SPS and PPS necessary for decoding each RAU are recorded in association with the RAU.

In the above-described embodiment, the decoder 13 reads the additional header situated before the first data unit in the RAU to be played back, and takes out an SPS and PPS necessary for decoding the picture slices included in the RAU from the SPSs and PPSs in the additional header. Then, the decoder 13 decodes the picture slices using the SPS and PPS taken out. Therefore, even if an RAU to be played back is in the middle of a sequence, picture slices included in the RAU can be decoded from the position in order. Since complicated processing, such as searching for an SPS and PPS situated before the RAU, is unnecessary, the order of steps for reading each data unit from the data file stored in the storage 12 is not complicated.

Accordingly, the video server of the present embodiment can play back a stored sequence from the middle with simpler processing.

In the above-described embodiment, the data file has the stream structure shown in FIG. 3. However, the data file may not have such a stream structure. For example, between picture slices included in the RAU, an SPS and/or PPS necessary for decoding the picture slices may be situated.

In such a case, the storage 12 reads the SPS and/or PPS included in the RAU in addition to the picture slices included in the RAU, and SPSs and PPSs in the additional header. The storage 12 outputs the read SPSs, PPSs and picture slices to the decoder 13.

The decoder 13 takes out a PPS designated by a number assigned to the picture slices from PPSs output from the storage 12. The decoder 13 takes out an SPS designated by a number assigned to the PPS taken out.

The decoder 13 decodes the picture slices using the SPS and PPS taken out. The decoder 13 outputs a video signal obtained by decoding to the subsequent stage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server comprising:
   an analyzer configured to:
   detect a picture slice, a sequence parameter set, and a picture parameter set in a stream of a data file, the data file comprising:
   a sequence of picture slices forming a picture, sequence parameter sets necessary for decoding the sequence; and
   one or more picture parameter sets for decoding the picture;
   store the detected sequence parameter set and the detected picture parameter set;
   generate, when the analyzer detects a first picture slice in each random access unit in the stream, an additional header comprising the stored sequence parameter sets and the stored picture parameter sets, which are detected during an analysis from a head of the stream to the detected first picture slice; and
   insert the additional header immediately before the random access units, the random access units comprising the picture slices; and
   a storage configured to store the data file in which the additional header is inserted.

2. The video server of claim 1, wherein:
   a number of a picture parameter set used for decoding is associated with each of the picture slices,
   a number of a sequence parameter set used for decoding is associated with the picture parameter set,
   the storage is configured to read, from the stored data file a picture slice in a random access unit, sequence parameter sets and picture parameter sets in an additional header inserted immediately before the random access unit, and
   the video server further comprises a decoder configured to decode the picture slice in the random access unit by using a picture parameter set corresponding to the number associated with the picture slice and a sequence parameter set corresponding to the number associated with the corresponding picture parameter set among the read sequence parameter sets and picture parameter sets.

3. The video server of claim 2, wherein:
   the storage is further configured to read the sequence parameter set from the random access unit when a sequence parameter set is situated after the first picture slice in the random access unit, and the decoder is configured to decode a picture slice in the random access unit by using a picture parameter set corresponding to a number associated with the picture slice and a sequence parameter set corresponding to a number associated with the corresponding picture parameter set among the sequence parameter sets in the additional header, the sequence parameter set situated after the first picture slice, and the picture parameter sets in the additional header.

4. The video server of claim 2, wherein:

the storage is further configured to read the picture parameter set from the random access unit when a picture parameter set is situated after the first picture slice in the random access unit, and the decoder is configured to decode a picture slice in the random access unit by using a picture parameter set corresponding to a number associated with the picture slice and a sequence parameter set corresponding to a number associated with the corresponding picture parameter set among the sequence parameter sets in the additional header, the picture parameter set situated after the first picture slice, and the picture parameter sets in the additional header.

5. The video server of claim 2, wherein:

the storage is further configured to read the sequence parameter set and picture parameter set from the random access unit when a sequence parameter set and a picture parameter set are situated after the first picture slice in the random access unit, and the decoder is configured to decode a picture slice in the random access unit by using a picture parameter set corresponding to a number associated with the picture slice and a sequence parameter set corresponding to a number associated with the corresponding picture parameter set among the sequence parameter sets and picture parameter sets in the additional header and the sequence parameter set and picture parameter set situated after the first picture slice.

6. A data recoding and playback method, comprising:

detecting a picture slice, a sequence parameter set, and a picture parameter set in a stream of a data file, the data file comprising a sequence of picture slices forming a picture, sequence parameter sets for decoding the sequence, and picture parameter sets necessary for decoding the picture;

storing the detected sequence parameter set and the detected picture parameter set, wherein a number of a picture parameter set used for decoding is associated with each of the picture slices, and a number of a sequence parameter set used for decoding is associated with the picture parameter set;

generating, when a first picture slice in each random access unit comprising the picture slices is detected in the stream, an additional header including the stored sequence parameter sets and the stored picture parameter sets, which are detected during an analysis from a head of the stream to the detected first picture slice;

inserting the additional header immediately before the random access units;

storing, in a storage, the data file in which the additional header is inserted;

reading, in response to a payback instruction from a controller, a picture slice in a random access unit, sequence parameter sets and picture parameter sets in an additional header inserted immediately before the random access unit; and decoding the picture slice in the random access unit using a picture parameter set corresponding to the number assigned to the picture slice and a sequence parameter set corresponding to the number assigned to the corresponding picture parameter set among the read sequence parameter sets and picture parameter sets.

* * * * *